United States Patent [19]

Muller et al.

[11] Patent Number: 4,715,179

[45] Date of Patent: Dec. 29, 1987

[54] METHOD AND DEVICE FOR THE REMOVAL OF SOLID COMPONENTS CONTAINED IN THE EXHAUST GASES OF INTERNAL COMBUSTION ENGINES

[75] Inventors: Eckart Muller, Gifhorn; Rudolf Beckmann, Wolfsburg, both of Fed. Rep. of Germany

[73] Assignee: Volkswagen AG, Wolfsburg, Fed. Rep. of Germany

[21] Appl. No.: 59,244

[22] Filed: Jun. 8, 1987

Related U.S. Application Data

[63] Continuation of Ser. No. 775,434, Sep. 12, 1985, abandoned.

[30] Foreign Application Priority Data

Sep. 14, 1984 [DE] Fed. Rep. of Germany ....... 3433781

[51] Int. Cl.⁴ .......................... F01N 3/02; F01N 3/18
[52] U.S. Cl. ........................................ 60/274; 60/285
[58] Field of Search ................. 60/274, 276, 285, 286

[56] References Cited

U.S. PATENT DOCUMENTS

| | | | |
|---|---|---|---|
| 3,851,632 | 12/1974 | Teshirogi | 60/276 |
| 4,319,451 | 3/1982 | Tajima | 60/274 |
| 4,452,040 | 6/1984 | Kobashi | 60/286 |
| 4,566,271 | 1/1986 | French | 60/286 |
| 4,574,589 | 3/1986 | Hasegawa | 60/286 |

*Primary Examiner*—Douglas Hart
*Attorney, Agent, or Firm*—Brumbaugh, Graves, Donohue & Raymond

[57] ABSTRACT

A method of eliminating solid particles contained in exhaust gas of an internal combustion engine having an exhaust line and fuel feed means with a maximum suppliable fuel flow, the method comprising the steps of providing a filter in the exhaust line for collecting the solid particles, regenerating the filter by burning off the solid particles collected, and limiting the maximum fuel flow of the fuel feed means during the regenerating step to an amount which results in a residual oxygen content in the exhaust sufficient to ensure complete combustion of the solid particles.

10 Claims, 1 Drawing Figure

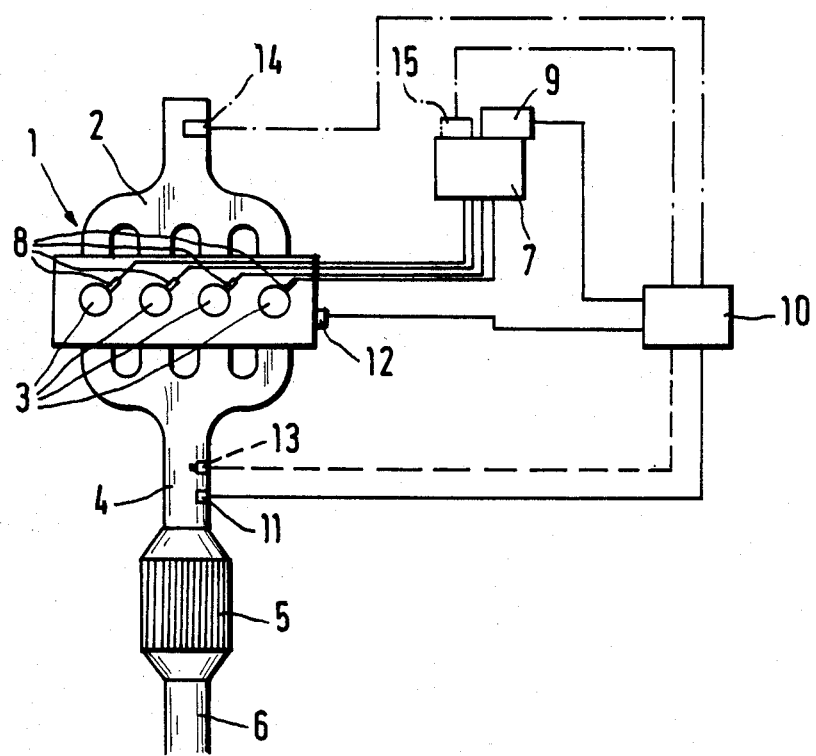

METHOD AND DEVICE FOR THE REMOVAL OF SOLID COMPONENTS CONTAINED IN THE EXHAUST GASES OF INTERNAL COMBUSTION ENGINES

This application is a continuation of application Ser. No. 775,434, filed on Sept. 12, 1985, now abandoned.

BACKGROUND OF THE INVENTION

The invention relates to a method for eliminating the solid constituents (particles) contained in the exhaust of internal combustion engines equipped with fuel feed means, in particular Diesel engines, and to a device for practicing the method.

To reduce the particle emission of internal combustion engines, in particular Diesel engines, filters are generally employed, which consist of, for example porous ceramic materials or steel wool fabrics. These filters will retain the particles entrained in the exhaust, in particular carbon particles and other incompletely burned hydrocarbons, from a certain particle size on. To prevent clogging of the filter and the consequent risk of putting the engine out of commission, these filters must be regenerated from time to time. The regeneration is accomplished as a rule by combustion of the accumulated combustible particles, and is triggered by attainment, spontaneous or controlled, of an exhaust temperature required for such a combustion.

However, combustion of the particles accumulated in the filter can take place only if the exhaust has an oxygen concentration of at least about 3 to 5%. But the oxygen content in the exhaust of Diesel engines, in particular of suction type engines, is often distinctly below these values in the full-load range. The consequence is that despite high exhaust temperatures, the particles collected in the filter cannot burn, and the exahust back-pressure therefore rises. This exhaust back-pressure rise in turn leads to a reduction of the air throughput and hence, since the fuel feed means associated with the engine continues to deliver a fuel flow adapted to the load demand, to a further decline of oxygen content in the exhaust and a further intensified carbon emission of the engine. So the filter gradually clogs, and the power output declines very rapidly, until the engine comes to a stop and cannot be restarted.

SUMMARY OF THE INVENTION

Accordingly, it is an object of the present invention to provide a method and a device which, during a regeneration mode, achieve positive and total combustion of the particles accumulated in the filter under all conditions, even when the engine is under full-load demand.

Pursuant to this object, and others which will become apparent hereafter, one aspect of the invention resides in a method for removal of exhaust gas particles, wherein during the regenerating phase the maximum fuel flow supplied is limited from above, namely in such manner that the residual oxygen content of the exhaust suffices for complete combustion of the solid constituents in the filter, and preferably amounts to at least about 3 to 5%. Advantageously, this full-load flow limitation can be obtained by an adjustment, known per se, of the full-load stop of a fuel injection pump as used in Diesel engines, the setting of this stop being feasible both as a function of the exhaust back-pressure, optionally modulated by the engine speed, and as a function of the exhaust oxygen content measured or ascertained immediately ahead of the filter.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing shows a schematic block diagram of an embodiment of the present invention.

DETAILED DESCRIPTION OF THE PREFERRED EMBODIMENTS

In the drawing, 1 generally designates an internal combustion engine, for example a multi-cylinder Diesel engine, whose intake line is indicated by 2 and its exhaust line, opening into an exhaust pipe 6, by 4. The exhaust line 4 has a filter 5, consisting of, for example, a ceramic honeycomb element, to collect the solid constituents carried off by the exhaust from the combustion chambers 3 of the engine 1. These particles, consisting especially of soot, which is to say unburned elementary carbon, tend to clog the filter 5 after a period of operation, but can be eliminated, during a regeneration phase, by burning them off if a sufficiently high exhaust temperature is imposed. The oxygen required for this operation may per se be drawn from the residual oxygen contained in the exhaust of Diesel engines. Under certain operating conditions, however, as for example at full engine load or with an unduly high exhaust back-pressure, the excess oxygen contained in the exhaust does not suffice to ensure complete combustion of the solid particles.

The present invention proposes, during these regenerating phases, to accomplish positive combustion of the solid constituents at all times by limiting the maximum fuel flow supplied so that there is always a sufficient excess oxygen supply in the exhaust. For this purpose, a fuel injection pump 7, which is associated with the engine 1 and delivers the fuel to injection nozzles 8 assigned to the several cylinders 3 of the engine, is furnished with a device 9 to limit the maximum fuel flow supplied. This device may consist of a device, known per se, for adjusting the full-load stop of the fuel pump 7.

Very schematically, in the drawing this full-load adjusting device 9 is connected with a control means 10 that effects an adjustment of the full-load stop in response to characteristic parameters. One such parameter, as a function of which the limitation of fuel flow may be controlled, is for example the exhaust back-pressure measured ahead of the filter 5 in the exhaust line 4. A sensor measuring this pressure is indicated by 11 in the drawing, and connected to the control means 10 by a signal line. Since in such a measurement of the exhaust back-pressure only, there is no allowance for the variation of the exhaust pressure as a function of engine speed, it is expedient to modulate the control pressure, derived from the exhaust back-pressure, according to the speed, for which purpose the control means 10 is additionally connected to a speed element 12 which detects the speed of the engine 1.

A further possibility for controlling the maximum fuel injection flow may be realized by direct detection of the excess oxygen existing in the exhaust ahead of the filter 5, for which purpose an oxygen sensor 13 detecting the oxygen content is indicated by a dotted line to the exhaust line 4. With use of such an oxygen sensor 13, the limitation of the maximum fuel flow supplied would be carried to lower values until a presumably adequate amount of excess oxygen, about 3 to 5%, is present in the exhaust.

Instead of such an oxygen sensor, alternatively a measurement of the engine air throughput might be made by an otherwise known airflow measuring means 14, and in addition, if desired, a measurement of the actual fuel throughput with the aid of a flow measuring means 15 associated with the fuel injection system. Also as a function of the readings detected by these measuring means, from which the excess of air contained in the exhaust can be directly inferred, the maximum fuel flow may be controlled.

With such a limitation of the maximum fuel flow, there is of course also a limitation of the maximum output attained by the engine. This limitation of power, however, takes place only during the regenerating phase of the particle filter, and serves at the same time to ensure rapid and complete combustion of the solid constituents accumulated in the filter.

While the invention has been illustrated and described as embodied in a method and device for the removal of solid components contained in the exhaust gases of internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by letters patent is set forth in the appended claims.

1. A method of eliminating solid particles contained in exhaust gas of an internal combustion engine having an exhaust line and fuel feed means for injecting fuel into combustion spaces of the combustion engine for power generation, the fuel feed means having a maximum suppliable fuel flow which is injected at a full load condition of the combustion engine, the method comprising the steps of: providing a filter in the exhaust line for collecting the solid particles; regenerating said filter by burning off the solid particles collected; and limiting, at the full load condition of the engine, the maximum fuel flow of the fuel feed means during said regenerating step to an amount which results in a residual oxygen content in the exhaust sufficient to ensure complete combustion of the solid particles.

2. A method as defined in claim 1, wherein said limiting step includes limiting the maximum fuel flow supplied to the engine to a value resulting in a residual oxygen content in the exhaust of at least about 3 to 5%.

3. A method as defined in claim 1; and further comprising the steps of measuring the exhaust gas oxygen content ahead of said filter, and controlling the maximum suppliable fuel flow as a function thereof.

4. A method as defined in claim 1; and further comprising the step of controlling the maximum suppliable fuel flow as a function of exhaust gas back pressure ahead of said filter.

5. A method as defined in claim 4, wherein said controlling step includes additionally controlling the maximum suppliable fluid flow as a function of engine speed.

6. A device for removing solid particles contained in exhaust gas of an internal combustion engine having an exhaust line, comprising: fuel supply means for injecting fuel into combustion spaces of the combustion engine for power generation, the fuel supply means having a maximum suppliable fuel flow which is injected at a full load condition of the combustion engine; a filter located in the exhaust line of the engine so as to trap the solid particles; and means for limiting, at the full load condition of the engine, the maximum suppliable fuel flow of said fuel feed means so as to provide a residual oxygen content in the exhaust gas sufficient to ensure combustion of the solid particles trapped in said filter.

7. A device as defined in claim 6, wherein said limiting means includes an oxygen sensor provided in the exhaust line ahead of said filter so as to detect oxygen content of the exhaust gas and emit a corresponding signal, and means for controlling said fuel supply means as a function of said oxygen sensor signal so as to limit the amount of maximum suppliable fuel flow.

8. A device as defined in claim 6, wherein said limiting means includes air flow measuring means for measuring engine air throughput, and means for controlling said fuel supply means as a function of said air throughput measurement so as to limit the amount of maximum suppliable fuel flow.

9. A device as defined in claim 8, wherein said limiting means further includes means for measuring fuel flow actually supplied to the engine, said controlling means further controlling said fuel supply means as a function of the actual fuel flow measurement.

10. A device as defined in claim 6, wherein said fuel supply means includes a fuel injection pump with a full-load stop, and an apparatus provided so as to set said full-load stop of said fuel injection pump.

* * * * *